United States Patent [19]
Johnson

[11] Patent Number: 5,644,888
[45] Date of Patent: *Jul. 8, 1997

[54] HEAVY CONSTRUCTION SYSTEM USING COMPOSITE MEMBERS

[75] Inventor: David W. Johnson, San Diego, Calif.

[73] Assignee: Ebert Composites Corporation, San Diego, Calif.

[*] Notice: The portion of the term of this patent subsequent to Feb. 15, 2011, has been disclaimed.

[21] Appl. No.: 259,431

[22] Filed: Jun. 14, 1994

Related U.S. Application Data

[63] Continuation-in-part of Ser. No. 7,079, Jan. 21, 1993, Pat. No. 5,319,901.
[51] Int. Cl.$^6$ .................................................. E04H 12/02
[52] U.S. Cl. .................................... 52/651.01; 52/651.02; 52/651.09; 403/230; 403/263; 403/169; 403/171; 403/176; 403/217
[58] Field of Search ........................... 52/651.02, 651.03, 52/651.09; 403/230, 231, 263, 169, 171, 176, 217

[56] References Cited

U.S. PATENT DOCUMENTS 5,319,901  6/1994  Goldsworthy et al. ............. 52/651.02

Primary Examiner—Carl D. Friedman
Assistant Examiner—Christopher Todd Kent

[57] ABSTRACT

Pultruded composite members which interfit to form a rigid post and beam, or beam and brace, are adapted for use in heavy construction in such applications as bridges, buildings including high rise structures, ship deck and the like. Two pultruded shapes are used for the entire framework. A first member ordinarily serving as a beam is pultruded as a completely enclosed thick-walled I-beam with an internal channel which is formed with a continuous scalloped or toothed cross-section on both sides. The mating support member has a bifurcated end with outer sides configured to interlock with the sides of the internal channel of the I-beam. Access into the channel is provided by periodic windows milled into the beam at the precise entry points of the insertion member. The bifurcated end of the insertion member compresses adequately to be inserted into the channel of the cross-beam, where it expands such that the external teeth engage the scalloped walls of the I-beam and lock securely into place. A block is then positioned between the tines to prevent their closure so that a positive lock of extreme strength is provided between the two members.

18 Claims, 4 Drawing Sheets

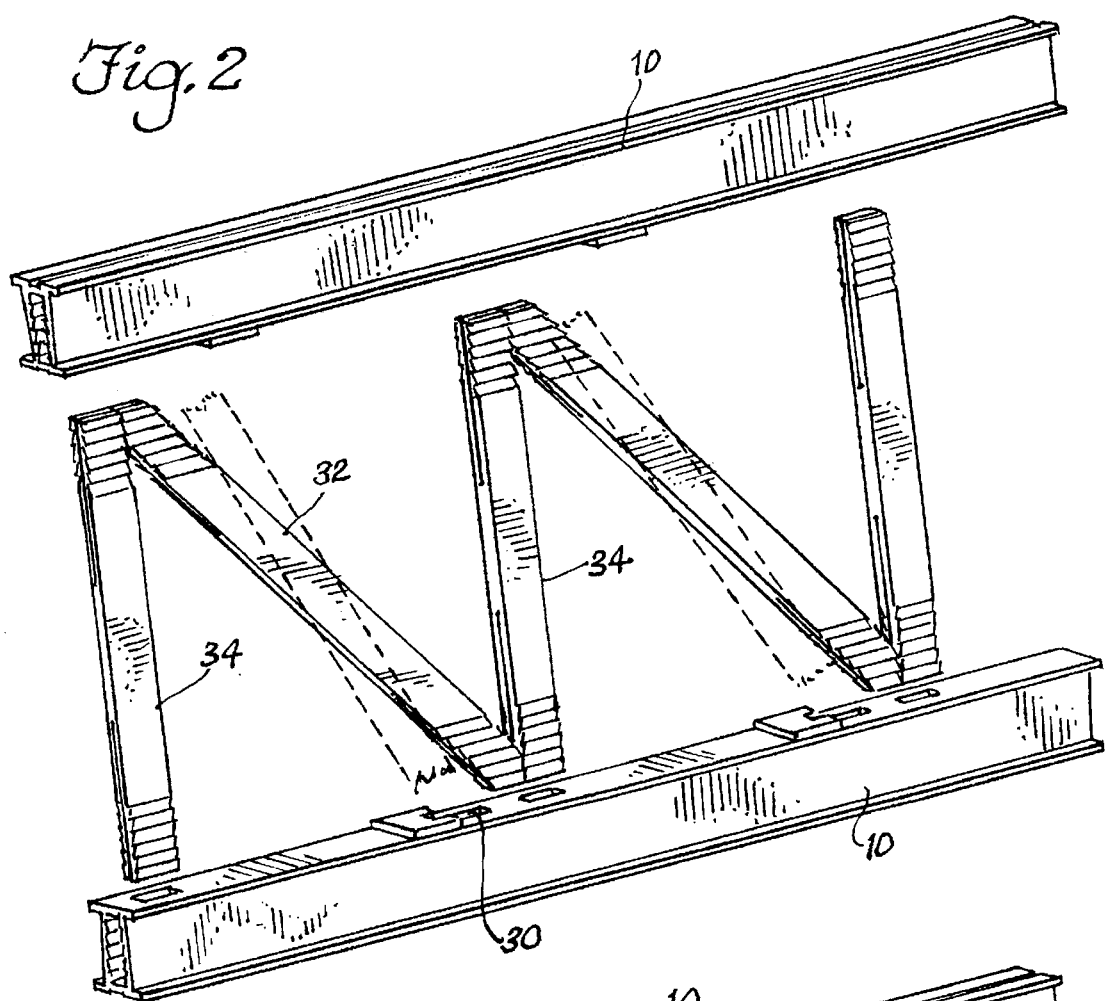

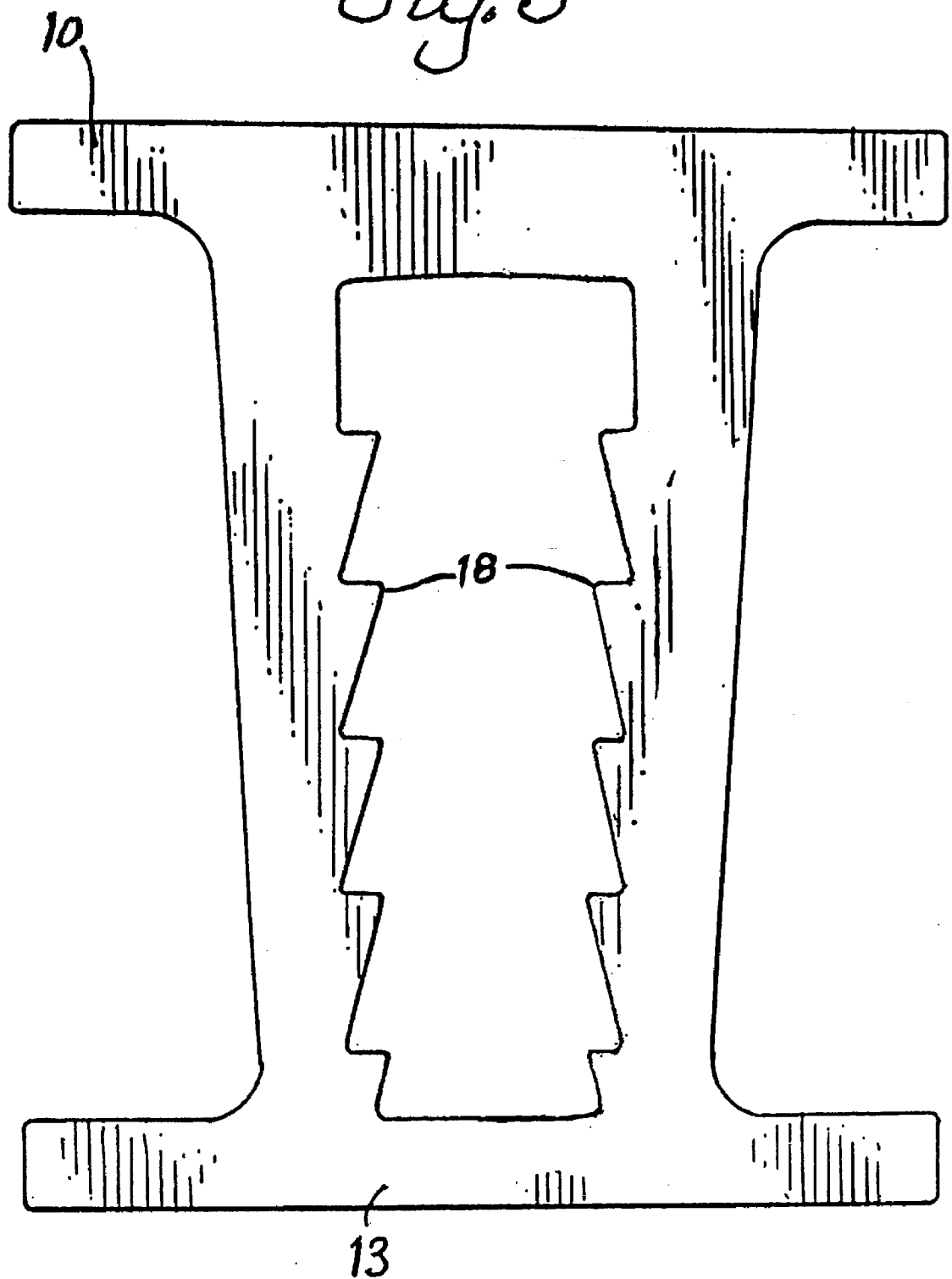

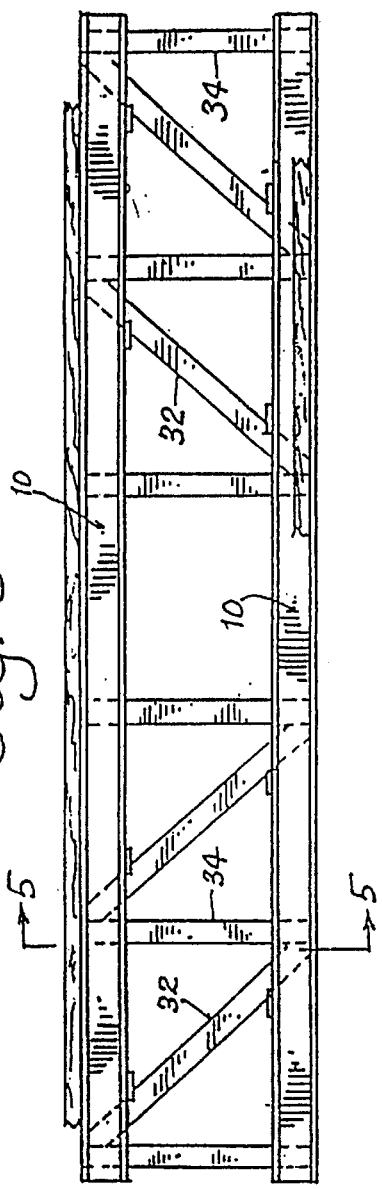
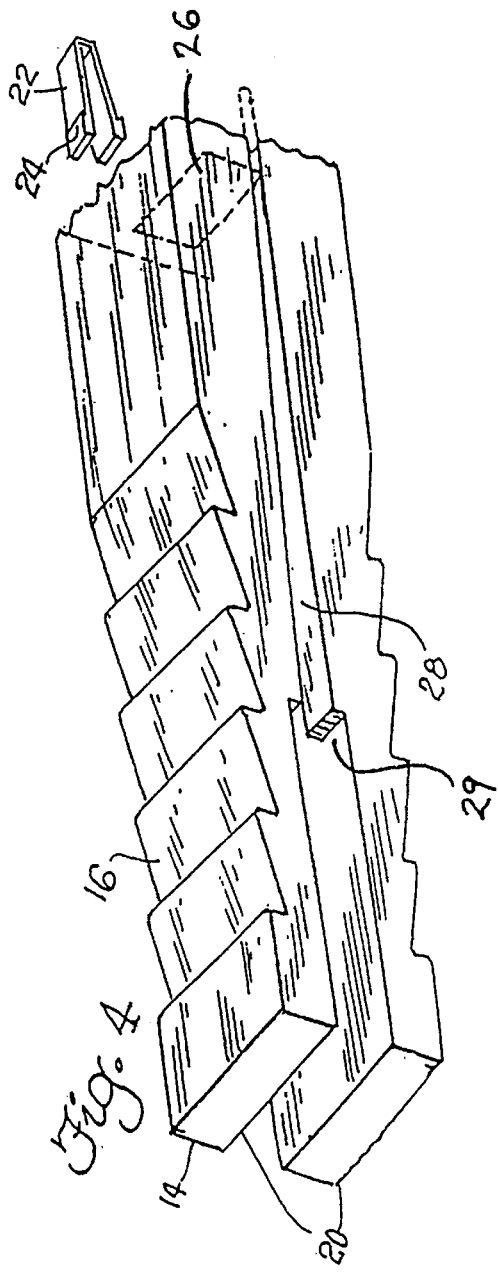
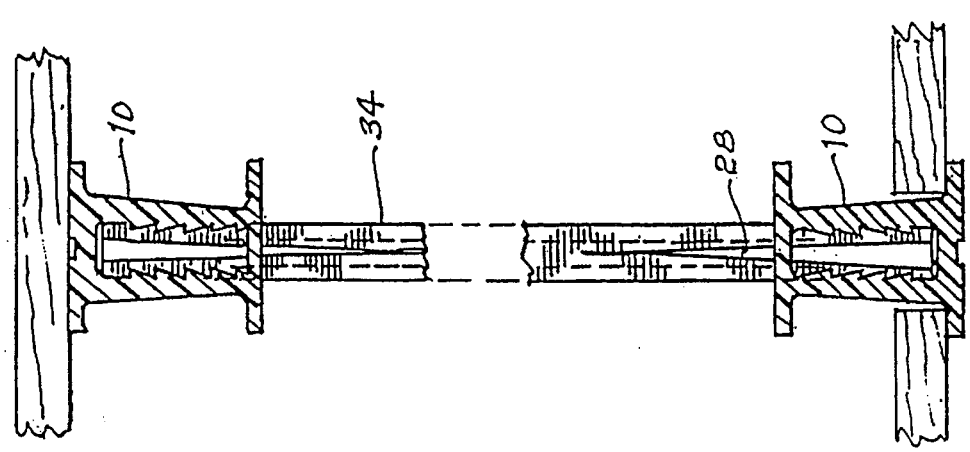

HEAVY CONSTRUCTION SYSTEM USING COMPOSITE MEMBERS

This disclosure is a Continuation-in-Part of patent application Ser. No. 007,079 filed on Jan. 21, 1993 by the same inventors for a BIFURCATED COLUMN JOINT SYSTEM FOR ELECTRICAL TRANSMISSION TOWER, issued on Jun. 14, 1994 as U.S. Pat. No. 5,319,901.

BACKGROUND and SUMMARY

This disclosure is one of a series related to pultruded composites and particularly to their use as structural members. Several of the previous disclosures related to a high-voltage transmission tower which utilizes the same basic members that are disclosed herein. The transmission tower of the prior disclosures, including the parent patent to this Continuation-in-Part application, utilized four continuous legs or posts at the corners of the tower, the legs being outwardly concave to form the overall silhouette of the tower. Each leg was a continuous pultrusion having a pair of orthoginal internal channels which seated the orthogonally related bifurcated ends of pultruded cross members inserted therein through openings cut through the side wall or skin of the leg.

The transmission tower demonstrated the practicality of creating very strong joints between large composite structural members irrespective of the complexity of the angles at which such members met. The same basic construction is used in the instant disclosure, with the leg members of the prior disclosure used as the I-beams of the heavy construction applications of this disclosure. Similarly, the cross members of the prior disclosures relating to transmission towers are parallel to the support members of the instant disclosure, which fit into the internal voids of the I-beams. The same locking mechanism is used, comprising a block which slides through the hollow cross member to its bifurcated end to prevent the tines from opening once they have expanded.

One of the principle significant features of this disclosure is the use of pultrusions to form large structural members used in construction projects of about the largest scale attempted for steel structures. Trusses are disclosed supporting up to 10,000,000 pounds with nothing more than composites in the assembly.

Having gone this far with composites it is apparent that there is little that could not be done structurally with composite pultrusions if strength is the primary criterion. The disclosed system is the essence of simplicity. For the I-beam and the mating support member, two pultrusion dies only are required. With these two dies, one creating the I-beam with an internal configuration which mates with the external configuration to be machined into the other pultrusion, any brace, truss or frame structure can be made with intersections between the I-beams and the supporting members occurring at virtually any angle.

BRIEF DESCRIPTION OF THE DRAWINGS

FIG. 1 is the completed truss made from the components of the invention;

FIG. 2 is an exploded perspective of the truss of FIG. 1 illustrating in phantom the manner in which the assembly of the perch is done;

FIG. 3 is a diagrammatic cross-section illustrating the formation of the plies of the pultrusion from which the I-beams are made;

FIG. 4 is a perspective view of the end of a support member illustrating the externally directed interlocking teeth;

FIG. 5 is a section taken along 5—5 of FIG. 6;

FIG. 6 is an elevation view of a deck structure made from the trusses of the instant disclosure;

DETAILED DESCRIPTION OF THE PREFERRED EMBODIMENT

Figure 8:
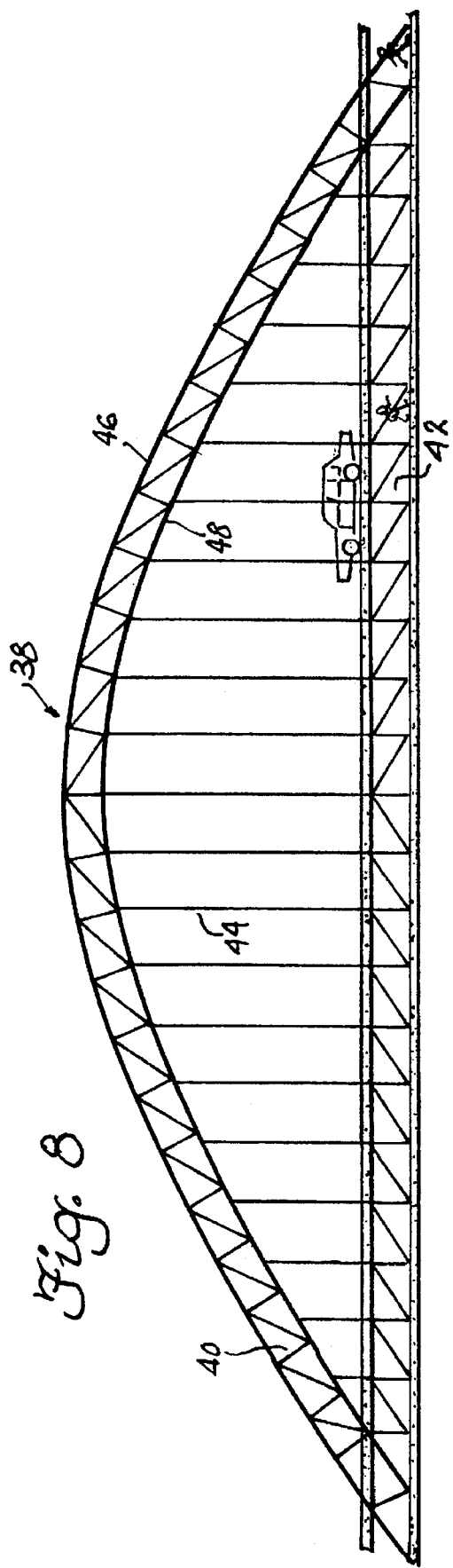
FIG. 8 is a diagrammatic illustration of a suspension bridge using the beam and support member-defined truss of the instant invention.

The two parts of the invention are illustrated in FIGS. 3 and 4, which represent the I-beam 10 with its slotted internal void 12 and the supporting member 14, having external teeth or convulsions 16 which mate with similar structure 18 defining the side walls of the internal channel 12 of the beam.

The I-beam is a straight forward pultrusion made on a mandrel configured in cross-section to define the slot 12 and a die to form the external surfaces of the beam. It is formed as an enclosed unit with a thick unbroken external skin 13 for reasons of strength despite the fact that one of the walls will have to be cut away to allow insertion of the end of the support member. The I-beam is tapered slightly as can be seen in FIG. 3 to improve the weight distribution between the mating teeth of the beam and the support. As in the parent patent, the joint between the beam and the support member is formed by compressing the tines 20 together with any suitable clamp or compression device, most suitably a hydraulically operated unit due to the high compression requirements. Once inserted into the slotted channel 12 of the I-beam the compressive forces are released, permitting the tines 20 to expand and engage the toothed channel structure 18 of the I-beam.

Although this engagement is quite strong, to ensure that the joint remains connecting and avoid the wobbling of the I-beam relative to the support member under stress, a block 22 which may have pegs 24 rides in the hollow rectangular void 26 of the support member, stopped from recessing beyond a certain point by engagement of the pegs 24 and the nip 29 of the bifurcation 28. The block is moved by pushing the tabs and secured if necessary by any of a number of means in its final resting place. The resulting lock between the support member and the beam is extremely strong and due to the modulus of elasticity of the pultruded members, the entire construction will tend to move together and act as a unit.

Although the channel could be continuously open, the best design of the beam and support combination uses a window, indicated at 30, cut into the skin 13 of the I-beam at its reduced end to just the size of the support member that will be inserted therethrough, with no longitudinal slack of any magnitude. In order for this construction to work, the truss assembled from the two members must be handled in a special manner as shown in FIG. 2. Unlike most types of construction, in which one member is inserted and then another and then another, and so forth, the truss has to be made all at once, with the pieces being fit together and slid into place at the same time, that is, unless there are no diagonal braces 32 in the truss, which would be unusual. As shown in FIG. 2, the diagonals start at a slightly steeper angle than the angle of their final orientation so that ends may slip through the windows and then be rotated into their final orientation as shown in solid in FIG. 2. The orthoginal supports 34 need not undergo this rotation for obvious reasons. Once these members have been pivoted in place and the uprights slid into place, and locked with the blocks 22, the entire truss is in essence completed and ready for use. A reinforcing collar 36 may be added for extra support at the edge of the window as shown in FIGS. 1 and 2, or a similar support could be bonded inside the I-beam, in a position comparable to the externally visible collars 36. Although these reinforcements could be installed with an adhesive or epoxy, generally speaking no such bonding agent is required between the main members, nor would it be particularly helpful inasmuch as the stresses in tension and compression that will be experienced by the members in heavy construction mode would not be effectively resisted by bonding strengths on order of magnitude of that provided by adhesive agents.

The fully assembled truss shown in FIG. 6 is about 40 feet long and eight feet tall and will support about 10,000,000 pounds.

The truss can be made to an indefinite length and is ideal for a bridge such as that shown in FIG. 8. This bridge 38 has an upper truss 40 which supports a lower truss 42 with suspension cables 44. Because of the flexibility of the composite medium, the upper truss could be made in the shape illustrated from single lengths of pultruded I-beam, and bent to the shape illustrated and rapidly assembled on-site by slipping the support members through the pre-cut windows in the I-beams. Calculating the positions of the windows and cutting them with software and machine equipment similar that used in the parent patent for the transmission tower would present little difficulty. The members would be most likely shipped pre-cut to the site and assembled in essence from a kit. However, since the I-beams could be pultruded as single lengths, 500 feet long or longer if necessary, if this were the chosen manner of construction the pultrusion equipment would be erected on-site.

Figure 7:
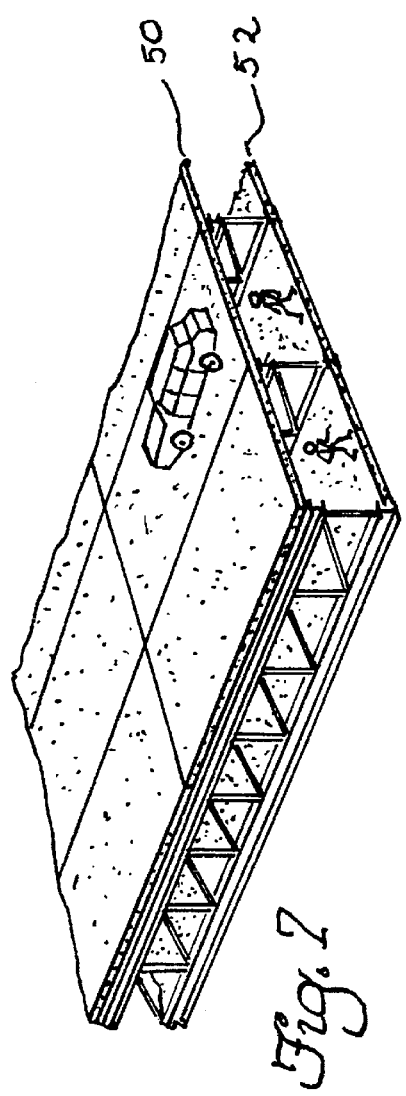
FIG. 7 is a perspective view of a completed or largely completed deck made from the trusses of the invention.

FIG. 7 illustrates an upper and lower level 50 and 52 of what could be an indefinite number of levels, being stories of a building or decks of a ship. For military vessels these members have the obvious advantage of producing a lower radar and sonar signatures than do the equivalent metal structures. Noise is reduced because transmittal of engine noise is not nearly as efficient through composites as it is through steel.

The double deck structure in the bridge of FIGS. 7 and 8 are clearly merely illustrative of the types of application for which the illustrated construction techniques are suited. There is no physical reason that composites should be limited to axe handles and surfboards. There is no more natural limit on the size of structure that can be made with pultruded members of the type illustrated than there is on the use of steel, other than habit. Composite strength-to-weight ratios superior to steel are routine. Many applications could take advantage of the electric and magnetic properties of composites compared to steel. Even a high rise office building would benefit in this regard inasmuch as radio wave transmissions are difficult to receive through the steel skeleton. Many structures from or to which radio waves are to be transmitted or received would benefit from the use of composites which are at least as strong by weight as wood, metal or any other commonly use construction material, and which have far better corrosion and decay resistance than either wood or steel. It is not at all farfetched to foresee the replacement of the "crumbling infrastructure" of the United States, the term by which the media refers to bridges and highways built more than 30 years ago which are in need of replacement, with composites. Innovations of the type shown in this disclosure, wherein the difficulty of joining composite members has been substantially overcome, will make such advances possible.

What is claimed is:

1. A beam and support member system using pultruded members in general construction in heavy construction projects, in which a pultruded composite beam and at least one support member are configured to couple together to define a joint, said system comprising:

(a) a pultruded composite beam having a longitudinal direction and defining a longitudinal internal seating channel extending substantially the entire length of said beam and having an entryway side, and being substantially completely enclosed except for at least one window to said channel open to the outside adjacent said entryway side of said channel;

(b) at least one support member having at least one seating end insertable into said seating channel through said at least one window;

(c) said channel defining support member retaining structure along at least a portion of the length thereof to rigidly engage the seating end of a support member butted through said window into said channel; and, (d) said at least one seating end of said at least one support member defining locking means cooperating with said retaining structure to insert into said channel and engage said retaining structure to define a rigid joint with said support member butted into said beam.

2. A system according to claim 1 wherein said beam is pultruded in a form which includes an enclosing skin completely covering said entryway such that said at least one window into said channel to permit the insertion of support members must be cut through said skin and additional windows can be precisely cut through said skin at those locations along said entryway where support members are needed.

3. Structure according to claim 2 wherein said beam and said at least one support member are structural members and said seating end is compressible and said locking means comprises detente elements externally defined on said seating end and said retaining structure is defined in the lateral sides of said seating channel and said support member and said channel are dimensioned such that said end must be compressed to enter said seating channel and when released expands such that said detente elements engage said retaining structure.

4. Structure according to claim 3 and including means operative with said seating end to permit said seating end to be inserted into said seating channel and being operative to block compression thereof once seated in said channel.

5. A system according to claim 1 wherein said retaining structure and detente elements comprise complimentary sawtooth elements defining a uni-directional motion direction of said support member whereby said seating end inserts into said channel in the direction toward and substantially normal to said beam but once inserted said support member will not withdraw in the direction opposite to the direction of said unidirectional motion.

6. A system according to claim 5 wherein said complimentary sawtooth elements are defined on both sides of said channel as integral pultrusion contours of the pultruded beam and extend substantially the entire length thereof.

7. A system according to claim 4 wherein said retaining structure and detente elements comprise complimentary sawtooth elements defining a unidirectional sliding action in the direction toward and normal to said beam into said channel, and said complimentary sawtooth elements are defined on both sides of said channel as integral pultrusion contours of the pultruded beam and extend substantially the entire length thereof and said seating end of said at least one support member is bifurcated to define two laterally compressible tines having outer lateral side walls and the sawtooth elements are outwardly directed on said outer lateral side walls, whereby a window can be cut through said skin at any location along said channel, a support member inserted and the tines permitted to expand to define a rigid joint.

8. A beam and support member system which a pultruded composite beam and at least one support member which are structural members for use in heavy construction are configured to couple together to define a joint, said system comprising:

(a) a pultruded composite beam having a longitudinal direction and defining a longitudinal internal seating channel extending substantially the entire length of said beam and being open to the outside over a longitudinal length at least adequate to permit the insertion of the end of at least one support member therein;

(b) at least one support member having at least one seating end insertable into said seating channel where said channel is open to the outside;

(c) said channel defining pultruded support member retaining structure along substantially the entire length thereof to rigidly engage the seating end of a support member butted into said channel;

(d) said at least one seating end of said at least one support member defining locking means cooperating with said retaining structure to insert into said channel and engage said retaining structure to define a rigid joint with said support member butted into said beam;

(e) the seating end of said support member being hollow to define an open-ended internal corridor bifurcated to produce two spaced mutually compressible tines having lateral side walls defining said locking means thereon such that said tines are compressed together to permit said seating end to be inserted in said channel, whereby upon releasing said tines said locking means move into seated locking engagement with said retaining means.

9. A system according to claim 8 and including a wedge block slidably received in said corridor with means to effect the sliding of said wedge block into said seating end to prevent said tines from moving together, whereby beam/support member joint rigidity is maximized.

10. A beam and a support member system in which a pair of pultruded composite beams and at least one pultruded composite support member are engaged to define a truss, said truss comprising:

(a) a pair of pultruded composite beams each having a longitudinal direction and defining a longitudinal internal seating channel extending substantially the entire length of the respective beam and being open over a longitudinal length thereof at least adequate to permit the insertion of the end of at least one support member therein;

(b) at least one support member defining two opposite seating ends which are seated in the respective seating channels of said beams where said seating channels are open;

(c) said channels each defining support member retaining structure along at least a portion of the length thereof to rigidly engage the seating ends of said support member seated in said channels; and, (d) said seating ends of said support member defining locking means cooperating with said retaining structure, locking together with same and defining rigid joints where said support member seats in said respective channels.

11. A system according to claim 10 wherein said support member is hollow to define an open-ended internal corridor which is bifurcated at said seating ends to produce at each end, two spaced mutually compressible tines having lateral side walls defining said locking means thereon such that said tines are compressible together to permit said seating ends to be inserted into said channels and upon releasing said tines said locking means move into seated locking engagement with said retaining means.

12. A system according to claim 11 and including a wedge block for each said seating end slidably received in said corridor with means to effect the sliding of the respective wedge block into said seating end to prevent said tines from moving together, maximizing beam/support member joint rigidity.

13. A system according to claim 10 wherein said at least one support member comprises a pair of support members of equal length and orthogonally inserted into said beams to define a rectangular truss member.

14. A system according to claim 13 wherein said channel has interior walls defining retaining structure thereon and said seating ends define locking means engageable to lock with said retaining structure and including at least one diagonal support member spanning between and inserted into said beams with the locking structure thereon engaged with said retaining structure.

15. A system according to claim 14 wherein said retaining structure comprises continuous channel sawteeth and said locking structure comprises continuous support member sawteeth matingly engageable with said channel sawteeth anywhere along the length of said continuous channel sawteeth and said diagonal support members are plural to define an elongated truss having multiple sections wherein each section includes a pair of upright support members and at least one diagonal support member.

16. A support system according to claim 15 comprising a suspension bridge wherein said elongated truss defines an upper truss of said suspension bridge.

17. A system according to claim 15 wherein said beams are I-beams having upper and lower support flanges.

18. A system according to claim 17 comprising a supported deck wherein said elongated truss is plural and defines at least two parallel elongated trusses and including deck panels spanning between and supported on the respective flanges of said I-beams.

\* \* \* \* \*

UNITED STATES PATENT AND TRADEMARK OFFICE
CERTIFICATE OF CORRECTION

PATENT NO. : 5,644,888
DATED : Jul. 8, 1997
INVENTOR(S) : David W. Johnson, W. Brandt Goldsworthy, George Korzeniowski It is certified that error appears in the above-indentified patent and that said Letters Patent is hereby corrected as shown below:

ON THE TITLE PAGE:

Item [19] reading "Johnson" should read --Johnson et al.--.

Item [75] reading "Inventor: David W. Johnson, San Diego, Calif." should read --Inventors: David W. Johnson,      Sunset Blvd., San Diego, Calif.      W. Brandt Goldsworthy,      Palos Verdes Estates, Calif.      George Korzeniowski, Sherman Oaks, Calif.

Signed and Sealed this

Second Day of September, 1997

Attest:

BRUCE LEHMAN

*Attesting Officer*          Commissioner of Patents and Trademarks